May 31, 1927. 1,630,311
C. REINEKE
INTERNAL COMBUSTION ENGINE
Filed Dec. 29, 1921 6 Sheets-Sheet 4

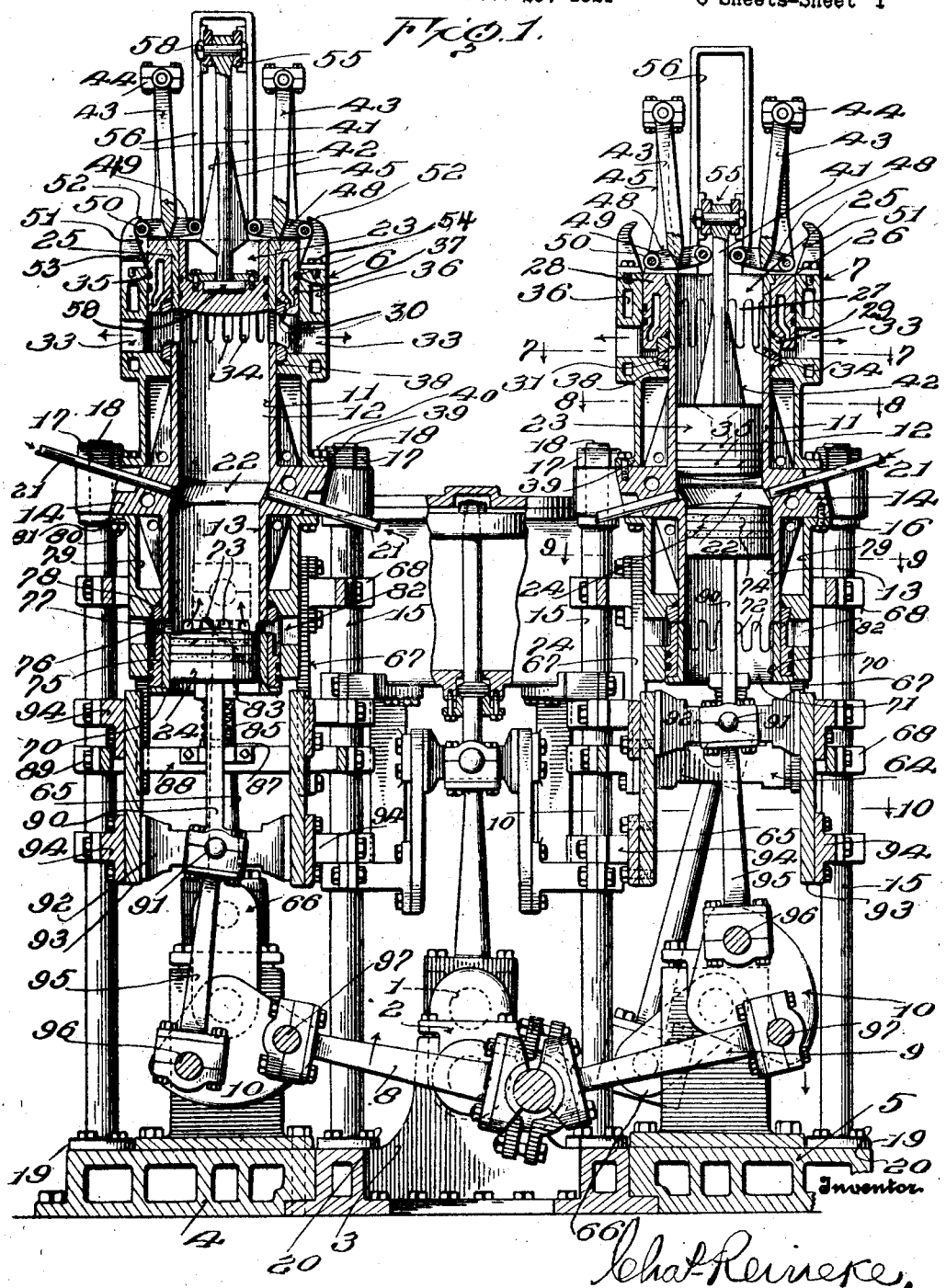

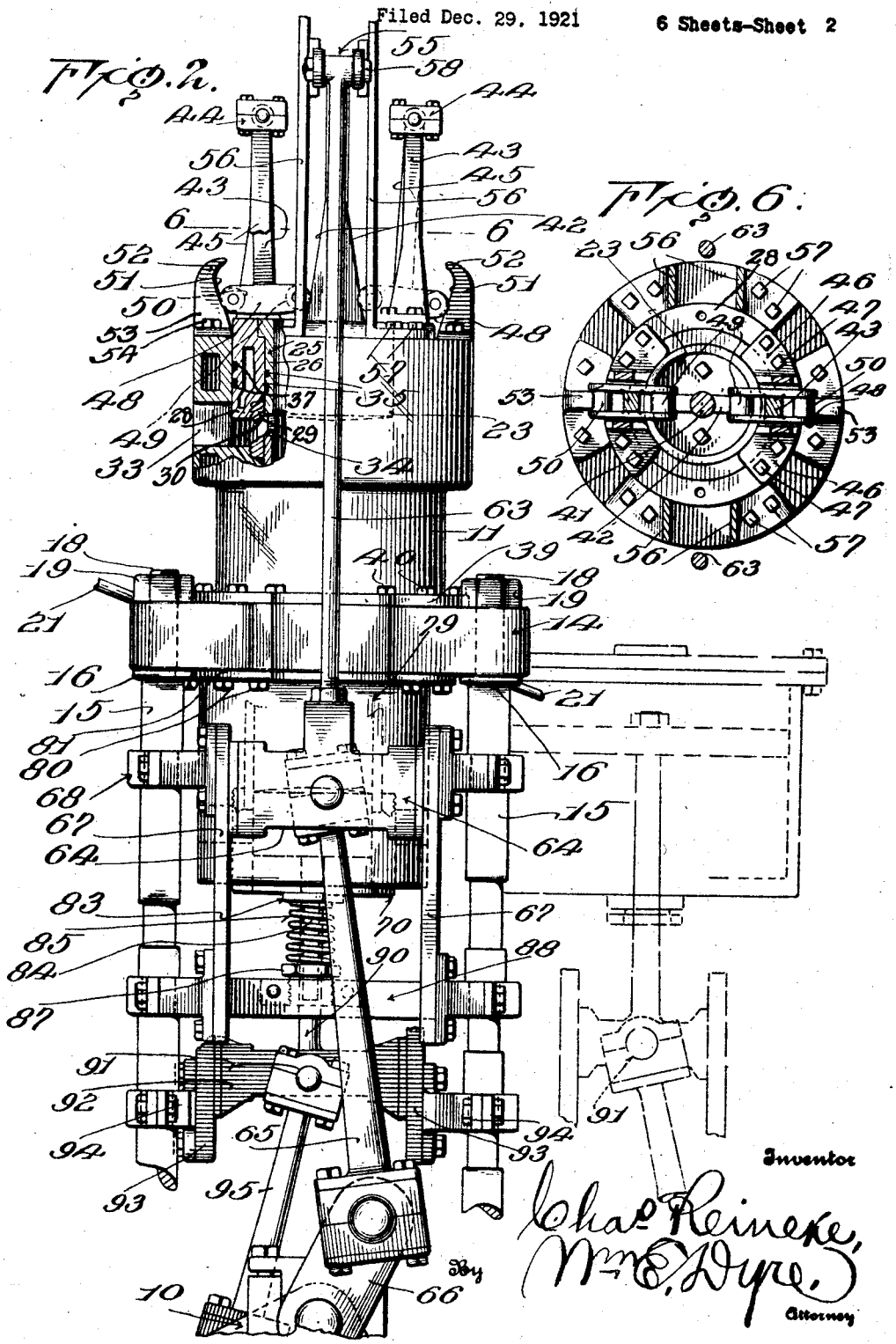

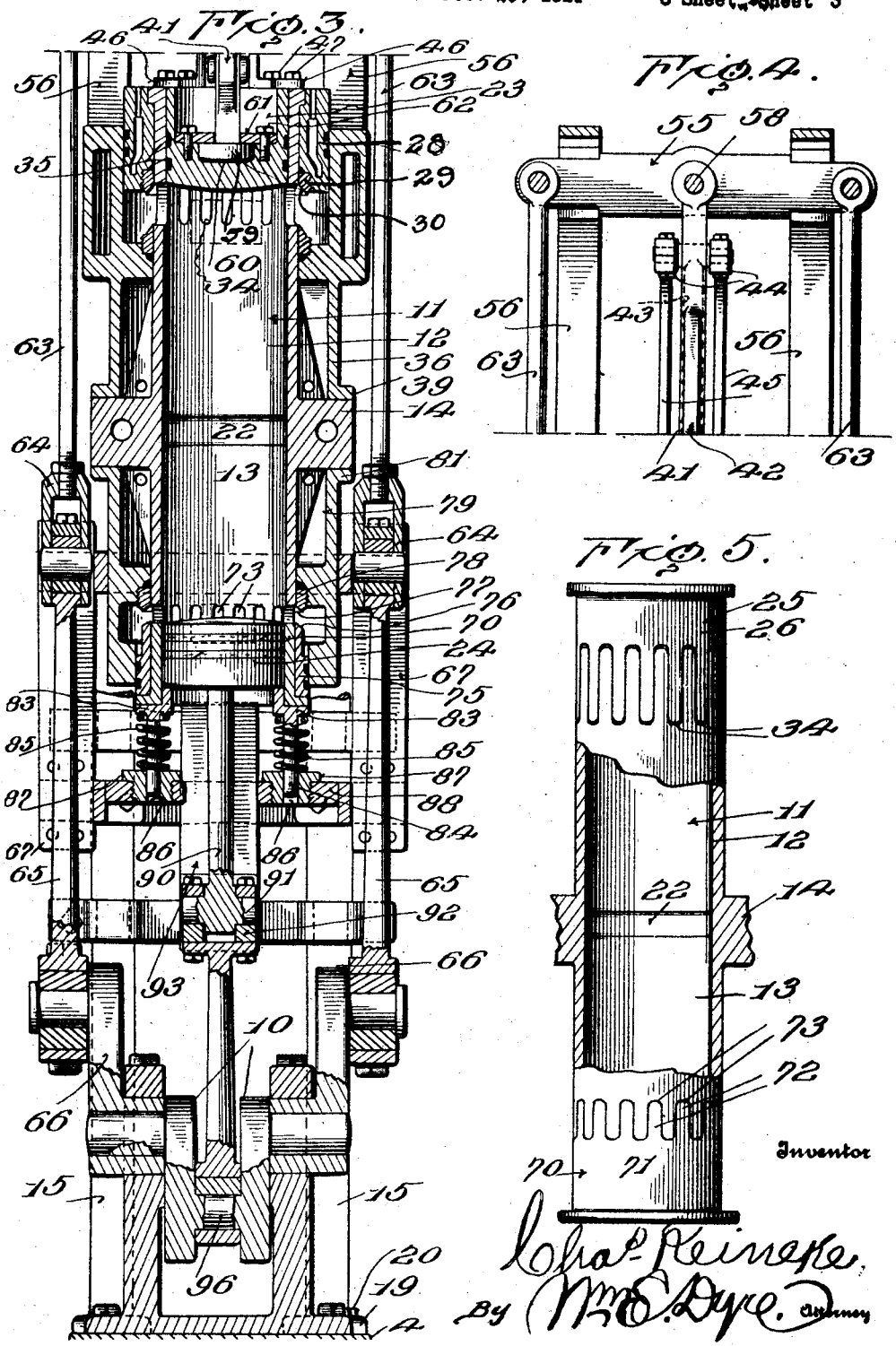

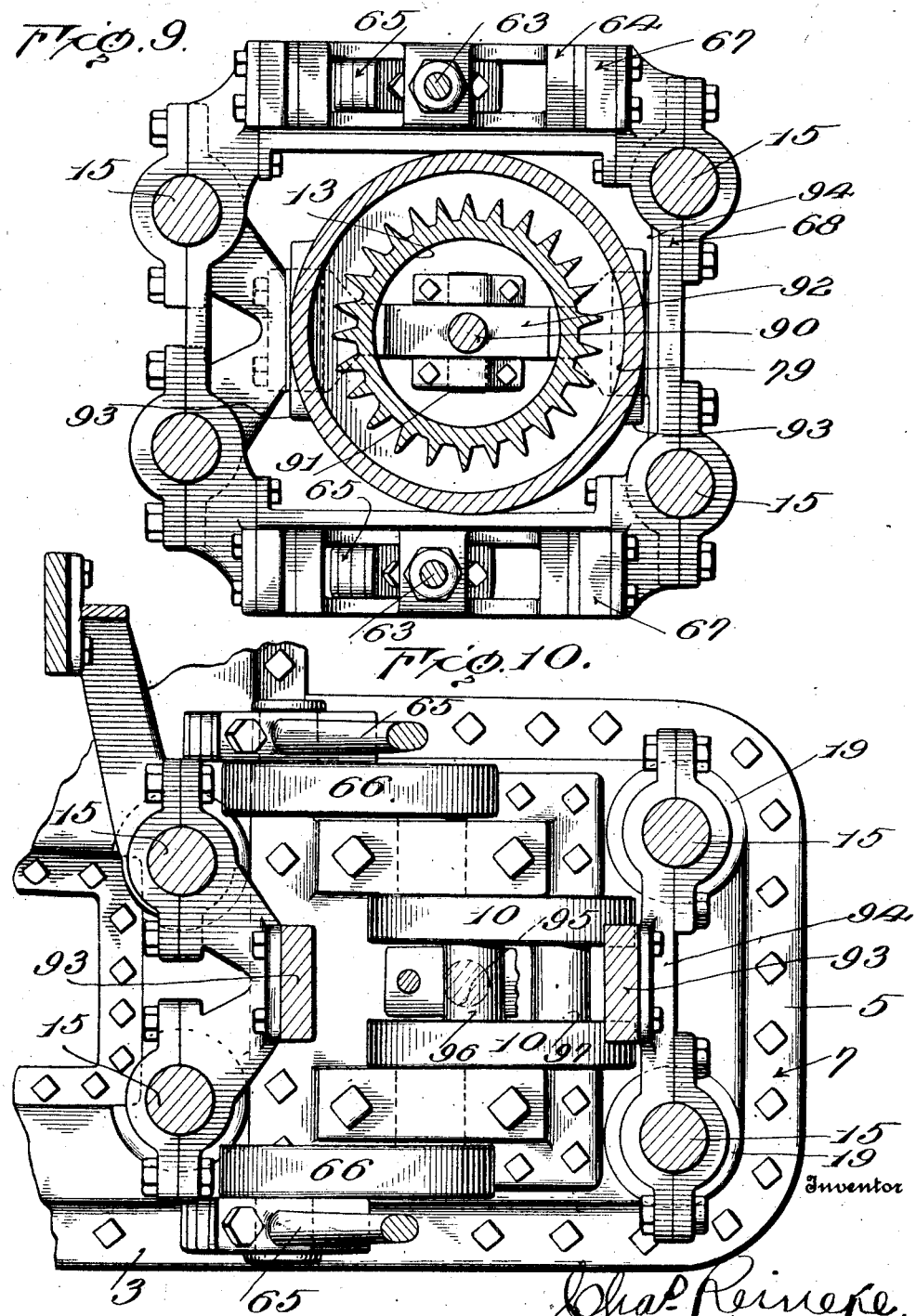

May 31, 1927.

C. REINEKE 1,630,311

INTERNAL COMBUSTION ENGINE

Filed Dec. 29, 1921

Inventor
Chas. Reineke,
By Wm. C. Dype,
Attorney

Patented May 31, 1927.

1,630,311

UNITED STATES PATENT OFFICE.

CHARLES REINEKE, OF NEW YORK, N. Y., ASSIGNOR TO THE REINEKE MOTOR CORPORATION, OF NEW YORK, N. Y., A CORPORATION OF DELAWARE.

INTERNAL-COMBUSTION ENGINE.

Application filed December 29, 1921. Serial No. 525,702.

My invention relates to improvements in engines, and more particularly to internal combustion engines of the opposed piston type.

An object of my present invention is to produce an engine having opposed reciprocating pistons arranged and adapted to impart power strokes to an oscillating crank, from which latter power is taken and transmitted to a work shaft, such as a propeller shaft for ships for example.

Another object of this invention is the production of an engine which can be readily installed in the place of and upon the foundation of the present steam engine, maintaining the same working conditions with regard to power, revolution, and in the case of ships, the same propeller shaft, crank shaft, and steam engine bed plate.

Another object of my invention is to produce an internal combustion engine arranged and adapted to impart power strokes to an oscillating crank, said engine embodying advantages of construction including offset cylinders arranged so as to permit the opposed pistons to function with less strain on the guides; also provide for compact arrangement of the connecting rods and prevent the cranks hanging on dead center; and also to permit the introduction of fuel so that it will be presented to the hottest portion of the piston.

A further object of this invention is to provide an oil engine of the opposed piston type, having novel valves arranged at the outer ends of the respective cylinders, said valves serving to permit a considerable reduction in the height of the engine, and provide for cooling of the piston by exposing same to the atmosphere, the said valves being operated by the pistons and capable of adjustment for advancing or retarding the opening and closing of the ports to allow surcharging and scavenging.

With these and other objects in view my invention consists in the construction and arrangement of the several parts hereinafter described and pointed out in the appended claims.

In the accompanying drawings wherein similar reference characters designate corresponding parts in the several views, Figure 1 is a vertical sectional view through my improved engine, illustrating its application to the crank of a propeller shaft;

Figure 2 is an enlarged view in elevation, partly broken away, of the upper portion of one of my improved engines;

Figure 3 is a vertical sectional view showing the opposed pistons extended, and taken at right angles to the sectional view illustrated in Figure 1;

Figure 4 is a continuation of Figure 3, showing the upper portion thereof;

Figure 5 is a detail view of the cylinder of my invention showing the cooperating scavenging and exhaust valves at each end thereof;

Figure 6 is a detail horizontal sectional view on the line 6—6 of Figure 2;

Figure 9 is an enlarged horizontal sectional view on the line 9—9 of Figure 1;

Figure 10 is an enlarged horizontal sectional view on the line 10—10 of Figure 1;

Figure 7:
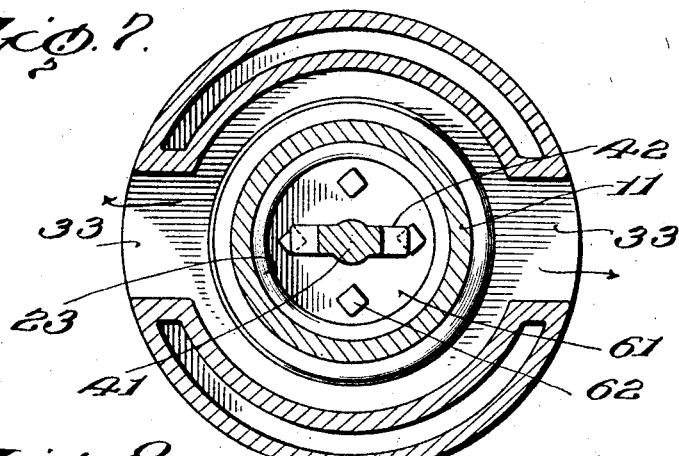
Figure 7 is an enlarged horizontal sectional view on the line 7—7 of Figure 1.
Figure 8:
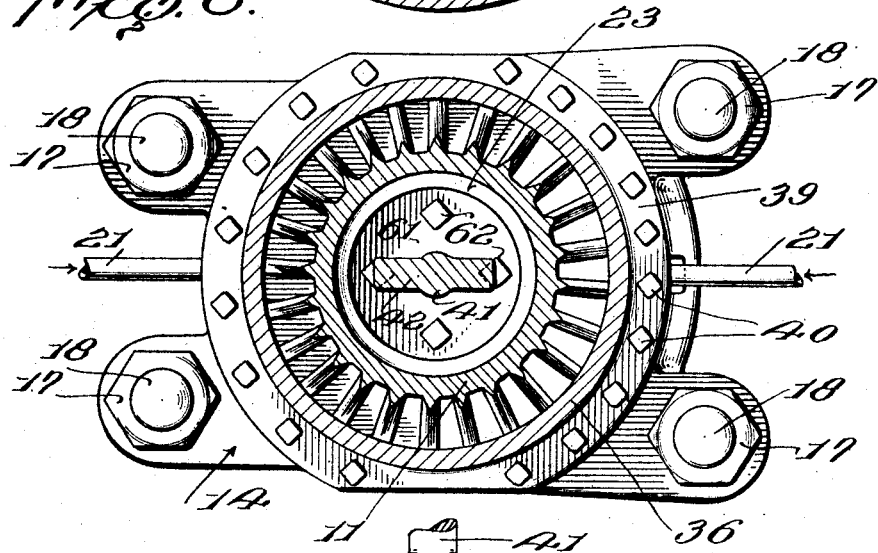
Figure 8 is an enlarged horizontal sectional view on the line 8—8 of Figure 1.

The present invention has been designed with a view to producing an effective oil or internal combustion engine capable of being readily connected to a ship's propeller shaft. In the accompanying disclosures, I have produced an engine wherein the crank shaft follows an oscillatory path of travel, thereby permitting a smooth and free action of the several parts interconnected therewith. For each power stroke of the piston an oscillation of the power shaft is obtained, power in turn being transmitted from the oscillating crank shaft to any type of work shaft.

In marine propulsion for which I have primarily designed the engine, a comparatively low propeller speed is desirable, and the direct connection of the oscillating crank shaft with the rotating propeller crank shaft permits of maximum efficiency in operation. The present arrangement of valves at the respective ends of the cylinder is an advantage, it being apparent that the height of the engine can be considerably reduced. It will also be seen that the present compact construction of engine makes it readily adaptable for use on ships from which the steam engine has been removed. In use, a plurality of relatively small oil engines of the type herein disclosed is arranged upon the old bed plate or foundation upon each side of the crank or propeller shaft and interconnected therewith as shown for example in Figure 1. The relative distribution of the power and the saving of space by the use of several small engines, are important factors, especially on ships, and in small engine rooms where the question of space is always foremost.

Referring to the drawings, and more especially to Figure 1, I have illustrated a crank or propeller shaft 1 supported in main journal bearings 2 provided on pillar blocks or plate 3 which latter may be secured to any suitable foundation. The cranks of the shaft 1 are coupled to the respective cranks of my improved engine. Inasmuch as all of the engines are of similar construction, I have confined the illustrations to but a single group of oppositely arranged and connected engines.

Engine bed plates 4 and 5 are arranged adjacent the plate 3. These several parts as well as the propeller crank shaft are of standard construction, and with but few exceptions constitute the usual foundations for the type of steam engine now in use.

Each engine 6 and 7 is connected with the propeller crank shaft 1, connecting rods 8 and 9 being interposed between the crank 1 and the oscillating crank element 10 of each engine, as shown in Figure 1. The construction of each engine being the same, I will describe but one in detail, applying the same reference characters to corresponding parts of the other engine as will be understood. My improved engine comprises, among other things a cylinder 11, the upper and lower portions 12 and 13 thereof being offset with respect to each other as clearly shown for example in Figure 1 and the axis of the crank shaft 10 is intersected by the axis of the portion 12 of the cylinder. The cylinder is provided with an intermediate and relatively thick flange 14 adapted to be secured to the upper ends of supporting columns or uprights 15. The flange 14 is secured between flanges 16 on the respective columns 15, and suitable nuts 17 screwed upon the threaded extensions 18 of said columns. Flanges 19 provided on the base of the columns 15 are secured by bolts 20 to the bed plate foundations.

Passing through the flange 14 of the cylinder are fuel inlet pipes 21, the same being arranged perpendicular to the angular offset 22 provided between the cylinder portions 12 and 13. The fuel may be introduced in any manner, a positive mechanical injection device being preferred. It will be seen from this construction that the fuel injected strikes the highest and hottest portion of the pistons.

The respective ends of the cylinder 11 are provided with port openings, said openings being controlled by valves arranged and adapted to effect proper scavenging and surcharging. These valves are respectively controlled by the movements of the opposed pistons 23 and 24 arranged within the cylinder portions 12 and 13 as clearly shown.

The upper valve 25, as shown in Figures 1, 2, 3 and 5, is slidably mounted with respect to the end of the cylinder 12, and comprises a sleeve 26 provided with downwardly projecting fingers 27. Secured to the sleeve 26 is an encircling water jacketed sleeve 28. A ring 29 is threaded into the sleeve 28 and is provided with a beveled seat or co-acting face 30. A similar ring 31 provided with a beveled face 32 encircles the cylinder 12 and is designed to coact with the ring 29 for effectively closing the valve. It will be seen that the coacting beveled faces 30 and 32 of the respective rings serve to effectively close or seal the ported openings and prevent the escape of the exhaust gases from the exhaust ports 33.

The ported openings of the cylinder 12 are indicated by the numeral 34, the same being relatively long fork-like openings into which the fingers 27 of the sleeve 26 project. The valve 25 is of the miter type, the fitting of the parts being sufficiently loose to prevent excess friction, as will be understood.

It will be seen from this construction that the fingers 27 of the valve 25 provide a relatively large surface area against which the piston 23 travels for the extended portion of its stroke. The rings 35 of the piston 23 are expanded against the finger portions 27 of the valve 26 and in the starting of the respective opening and closing movements of the valve 25, it will be seen that the aforesaid rings 35 in bearing against the fingers 27 actually begin the movement of said valve. The valve is picked up so to speak by the frictional contact of the rings 35 and the resulting action thereof is comparatively smooth and free from hammering.

The upper valve 25, and more especially the encircling water jacketed sleeve 28, is slidably mounted within the water jacketed casing 36. Packing rings 37 are carried by the sleeve 28 and serve to prevent the escape of the exhaust gases. A packing ring 38 is interposed beneath the ring 31 and prevents the exhaust gases and water from mixing, as will be understood. The casing 36 is water jacketed as shown, and has provided therein the exhaust openings 33 hereinbefore described. A flange 39 through which pass bolts 40 serves to secure the casing 36 to the flange 14 of the cylinder.

The means for effecting the full opening of the valve 25 is associated with and operated by the piston 23. Piston rod 41 is provided with inclines or cam surfaces 42 arranged diametrically opposite as shown, the said incline surfaces being arranged and adapted to operate swinging arms 43 interconnected with the valve 25. Each arm 43 is mounted in bearings 44 provided at the upper ends of uprights 45, the latter extending from and being secured to the sleeve 28 of the valve 25. These uprights 45 are provided with flange portions 46 secured to the said sleeve 28 by means of bolts 47, (see Figures 3 and 6).

The lower end of each arm 43 is provided with an extension 48 in each end of which is revolubly mounted the respective rollers 49 and 50. The roller 49 is cooperatively associated with one of the inclines 42, and the roller 50 is arranged and adapted to co-act with an incline surface 51 terminating in an arcuate portion 52, which latter serves to arrest the upward motion of the valve as will be understood. This inclined surface 51 and curved portion 52 are provided on a bracket 53 secured by means of bolts 54 to the upper face of the casing 36.

It will be seen in operation that as the piston 23 moves upwardly on a power stroke the inclines 42 come in contact with the rollers 49 and cause the arms 43 to swing outwardly thereby bringing the rollers 50 against the inclines 51, causing by this interlocking connection the lifting of the valve 25 until it has been arrested in its upper motion by the curved portions 52 of the brackets 53. By this construction, the valve 25 is lifted in a positive manner and with particular smoothness, thereby preventing any tendency of the valve to hammer.

Figure 11:
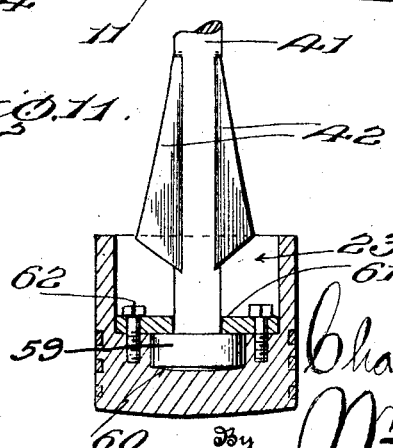
Figure 11 is an enlarged detail sectional view through the upper opposed pistons.

The piston rod 41 is connected at its upper end to a cross-head 55 slidably mounted in guides 56 forming the U-shaped bracket secured to the casing 36 by means of bolts 57 as best shown in Figures 2 and 6. A bolt 58 pivotally secures the piston rod 41 to the cross-head 55. The lower end of the piston rod 41 is provided with a circular head or flange 59 arranged within an annular recess 60 provided in the piston 23. Plate sections 61, as shown in Figure 11, are secured by bolts 62 against the upper face of the head 59 and serve to loosely retain the same within the recess 60. This construction permits of relative rotary motion of the piston 23 within the cylinder, and thereby permitting it to accommodate itself to the cylinder and to the fingers 27 of the valve sleeve 26 for cooperation therewith as has been hereinbefore described.

The upper piston 23 is connected to the oscillating crank shaft 10 by means of rod 63, the upper ends of which are secured to the cross head 55, and the lower ends of which are secured to cross heads 64 arranged upon each side of the cylinder. These cross heads 64 are arranged at rights angles to the upper cross head 55 and have secured thereto the upper ends of connecting rods 65, the lower ends of said connecting rods being secured to cranks 66 interconnected and secured to the crank shaft 10, (see Figure 3).

The cross heads 64 are mounted in guides 67 supported by means of separable bracket sections 68 secured to the uprights or columns 15. The guides 67 are supported at their upper and lower ends by the separable bracket sections, which as shown can be readily fitted and adjusted about the engine. These separable bracket sections also constitute the engine frame and add to the stability of the engine as will be understood. Their location upon the outside of the cylinder and in open framework formation provides for ready access when inspecting and repairing the engine as will be understood.

The lower piston 24 operable within the cylinder portion 13 is also connected with the oscillating crank 10 and is arranged and adapted to actuate a valve 70 in the lower ported end of the cylinder 13. The valve 70 comprises a sleeve portion 71 from which projects a series of fingers 72, arranged and adapted to cooperate with slot-like openings 73 forming the ports of the cylinder 13. This valve is similar in construction to the valve 25 and is of the miter type. Piston rings 74 are provided on the piston 24 and serve to co-act with the fingers 72 so as to start the opening and closing movements of the valve 70 as has been hereinbefore described in connection with the upper valve and piston. The sleeve 75 encircling the valve sleeve 71 is provided at its upper end with a beveled face 76 forming a co-acting face or seat with the beveled face 77 of the ring 78. This ring 78 encircles the cylinder 13 and is threaded within the water jacketed casing 79 secured to and depending from the flange 14 as shown. Bolts 80 passing through the flange 81 of the casing 79 secure said casing to the flange 14. The encircling sleeve 75 is movably mounted within the lower portion of the casing 79 and is provided with packing rings as shown.

The valve 70 is operably controlled by the piston 24, the said piston being arranged and adapted to strike projections 83 carried by said valve. These projections 83 are secured to the valve 71 and are diametrically arranged as shown in Figure 3. Depending rods 84 project from the valve 71 and have arranged thereabout springs 85. The lower ends of the rods 84 project into openings 86 provided in flanged nuts 87. The nuts 87 are adjustably threaded into a transversely arranged and separable frame section 88 secured by bolts 89 to the columns 15.

In operation the valve 71 is moved downwardly against tension of the springs 84 by means of the piston 24 striking the projections 83. When opened, scavenging air is allowed to pass through the ports 82 through the port openings 73 into the cylinder 13 above the piston 24 as will be understood. The return of the valve 71 is effected by means of the springs 84 which act to move the fingers 72 inwardly to close the ported openings 73. The piston 24 is provided with a piston rod 90 the upper end of which is secured to the piston in the same manner as piston rod 41 is secured to the upper piston 23 and as has been hereinbefore described. The lower end of piston rod 90 is connected by means of trunnions 91 to the cross head 92. The cross head 92 is offset as shown a corresponding distance to the offset of the cylinders and pistons. Guides 93 are provided for the cross head 92, said guides being supported at their upper and lower ends by means of separable bracket sections 94 which are in turn secured to the columns 15 as shown.

A relatively short connecting rod 95 is attached at its upper end to the cross head 92, and at its lower end to the crank pin 96 of the oscillating crank 10.

Figure 12:
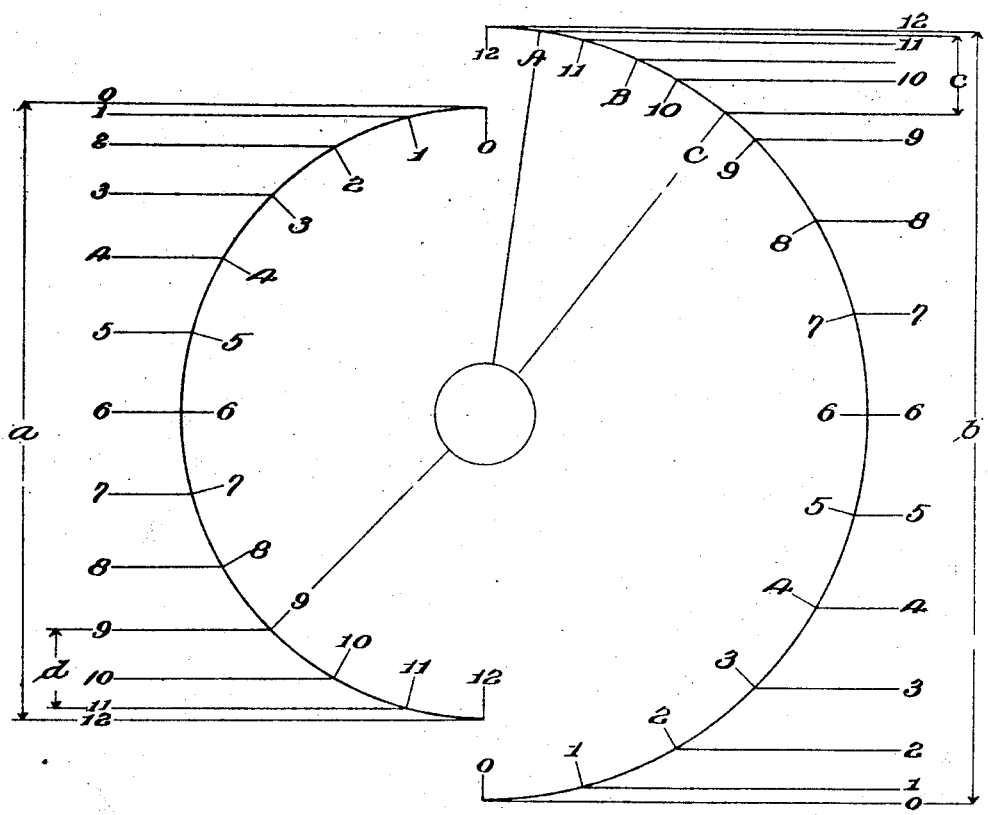
Figure 12 is a diagram illustrating the piston and crank travel of each opposed piston.

The throw of the crank pin 96 is less than the throw of the pin connected to the crank 66. This difference in radii between these cranks produces different piston travel in the cylinder portions 12 and 13, it being obvious that the upper piston 23 will have a relatively long stroke, and that the lower piston 24 will have a shorter stroke. This piston travel with relation to the crank pin travel is shown in Figure 12, the smaller semicircle indicating the travel of the crank pin 96 and the larger semi-circle indicating the travel of the crank pin 66. These semicircles are divided in equal parts as shown. The piston travel $a$ projected from the smaller crank semi-circle is that of lower piston 24. The piston travel indicated by $b$ projected from the larger crank semi-circle is that of upper piston 23. In the example given it will be seen that for an given distances such as those indicated by the letters $c$ and $d$, the respective travels are equal, and the amount that the port openings are opened and shut is the same as will be understood. By different arrangements of crank angles, various amounts of port openings can be had, and the same can be had at the various times desired with regard to the scavenging and exhaust ports. The amount of advance and retardation of the travel of the pistons and the cranks can be readily obtained.

In my present construction the relative timing of the valves 25 and 70 and the piston travel of each piston have been designed to effect the proper time interval during which the ported openings at the ends of the cylinder shall remain open for obtaining the proper scavenging of the cylinder 13. An adjustment of the cranks however can be made to vary scavenging and surcharging and it will be understood that I do not limit myself to the exact showing herein.

In operation it will be seen that the opposed pistons produce the oscillations of the cranks 10 in the direction of the arrow shown thereon in Figure 1, there being a complete oscillation of each crank for a single power stroke of the pistons. The offset relation of the respective pistons, together with their direct connection of offset cross heads and rod connections provide for maximum power strokes of each piston, and the transmission of said power strokes to the oscillating crank with minimum strain upon the several parts, and positive assurance for the oscillation of the crank 10. By reason of this offset arrangement it is possible to use a relatively short connecting rod 95 with the same advantageous results obtained from the use of a longer connecting rod. The provision of valves at each end of the aforesaid cylinders serves to materially reduce the height of the engine, as will be understood.

Through the connecting rods 8 and 9 the oscillatory movement of the cranks 10 is transmitted to the rotating crank or propeller shaft 1. The respective connecting rods 8 and 9 are connected to crank pins 97 provided on the oscillating cranks 10.

The installation of a series of oil engines constructed in accordance with my invention and oppositely arranged to the various arms or pins of the crank shaft can be readily effected, and the combined horse power of the several engines can be designed to equal the total horse power of the steam engine disconnected from the crank or propeller shaft. The use of oil engines on ships, for example, is particularly advantageous and in adapting my improved type of oil engine to the propeller shaft of a ship, great economy in space as well as economy in initial installation and maintenance are obtained. My improved engine, however, is not limited to use on ships, as it can be readily arranged and constructed for automobile and stationary or other uses.

Changes in the proportion, size, arrangement and construction of the several parts may be made, and I do not wish to be understood as limiting myself to the exact construction and application thereof which I have herein disclosed.

I claim:

1. In an internal combustion engine, the combination with a cylinder having offset portions, of opposed pistons arranged in said cylinder, an oscillating crank shaft arranged at one end of the cylinder and intersecting the axis of one of the offset portions of the cylinder, and means connecting said crank shaft with the aforesaid pistons for permitting the power strokes of said pistons to be transmitted to the crank shaft at points outside of a vertical plane through the center of the crank shaft.

2. In an internal combustion engine, the combination with a cylinder having offset end portions, of opposed pistons arranged in said cylinder, an oscillating crank shaft arranged at one end of the cylinder and intersecting the axis of one of the offset end portions of the cylinder, and means including connecting rods interposed between and connecting the aforesaid opposed pistons and oscillating crank shaft for imparting a power stroke of the pistons to the crank shaft for every complete oscillation thereof and at a point outside of a plane through the center of said crank shaft.

3. In an internal combustion engine, the combination with a cylinder provided with offset end portions, of opposed pistons arranged in said cylinder, the exposed oscillating crankshaft arranged beneath said pistons at one end of the cylinder and intersecting the axis of one of the offset end portions of the cylinder, and means connecting said crank shaft to the aforesaid pistons, said means including sliding cross heads and connecting rods arranged upon the outside of said cylinder and arranged in offset relation to each other.

4. In an internal combustion engine of the opposed piston type, the combination with a cylinder having offset portions, opposed pistons arranged in said cylinder, an oscillating crank shaft arranged at one end of the cylinder and intersecting the axis of one of the offset portions of the cylinder, said shaft having crank pins of varying radii, and means connecting the aforesaid pistons to the respective crank pins for permitting the power strokes of the pistons at a point outside of a plane through the center of the offset crank shaft.

5. An opposed piston internal combustion engine including in combination a cylinder having offset portions with parallel axes, opposed pistons arranged in said cylinder, the axes of said offset portions of the cylinder being sufficiently close together to permit the opposite ends of the pistons to overlap and to closely approach one another on the compression stroke, fuel intakes arranged between said offset portions and set to direct fuel onto the central portions of opposite ends of the pistons when the latter are at the end of the compression stroke, an air intake port at one end of the cylinder and exhaust ports at the other end of the cylinder, valves for said ports operably controlled by the pistons, piston rods connected to each piston, offset cross heads to which the opposite ends of the piston rods are attached, connecting rods having one end attached to the respective cross heads, and an oscillating crank to which the other ends of said connecting rods are attached, for permitting the power strokes of said piston to be always at a point outside a vertical plane through the center of said crank.

6. An engine including a cylinder having offset portions with parallel axes connected together by an intermediate portion, opposed pistons arranged in the offset portions of said cylinder, the axes of the offset portions being arranged sufficiently close together to permit the opposite ends of the pistons to closely approach one another and overlap, and the intermediate portion being of a length substantially equal to the distance between said axes, liquid fuel injection pipes connected to the intermediate portion of said cylinder and arranged to direct jets of fuel onto the heads of the pistons, air inlet and exhaust ports arranged in the offset portions of said cylinder, a drven shaft, and means operatively connecting said pistons to said shaft.

7. An internal combustion engine including a cylinder having offset portions, opposed power pistons arranged in the off-set portions of said cylinder and adapted to move in opposite directions when the charge explodes, an oscillating crank shaft arranged at one end of said cylinder and having its axis intersected by the axis of one of said off-set portions of said cylinder, and means connecting both of said pistons to said crank shaft for permitting the power strokes of said pistons to be transmitted to the crank shaft at points outside of a plane extending through the axis of the crank shaft and the axis of the above mentioned portion of the cylinder.

8. An opposed piston internal combustion engine including in combination a cylinder having offset portions in which the respective pistons operate, an oscillating crank shaft for said engine intersecting the axis of one of the offset portions of the cylinder, means connecting the crank shaft with the opposed pistons, a rotating work shaft, and means interposed between the said work shaft and oscillating crank shaft for imparting rotary motion to said work shaft.

9. The combination with a rotary work shaft, of oppositely arranged internal combustion engines of the opposed piston type, offset cylinders for each engine having opposed pistons arranged therein, a separate oscillating crank shaft associated with each cylinder and having its axis intersected by the axis of one of the off-set portions of the last mentioned cylinder, means connecting the piston of each cylinder with the oscillating crank shaft of that cylinder for permitting the power strokes of the pistons in that cylinder to be transmitted to its associated crank shaft at points outside of a plane extending through the axis of the crank shaft and the axis of the aforesaid off-set portion of the cylinder, and means connecting the oscillating crank shafts with the aforesaid work shaft for converting the oscillations into rotary movement.

10. The combination with a rotary crank shaft, of oppositely arranged internal combustion engines provided with oscillating crank shafts, each crank shaft having its axis intersected by the axis of a portion of the cylinder with which it is associated, opposed pistons arranged in each of said cylinders and operatively connected to the crank shaft of that cylinder, the axes of all of said shafts being arranged in a plane extending transversely of the cylinders, and means for connecting said oscillating crank shafts to the aforesaid rotary crank shaft.

In testimony whereof I affix my signature.

CHARLES REINEKE.